A. PIERCE.
Car Coupling.
No. 57,962.
2 Sheets—Sheet 1.
Patented Sept. 11, 1866.
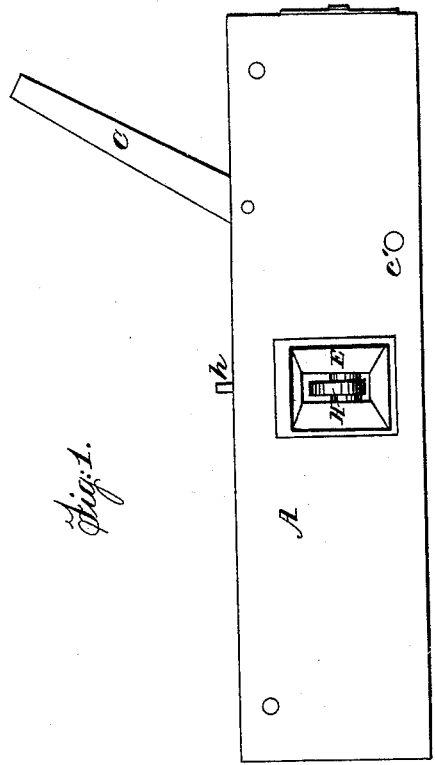
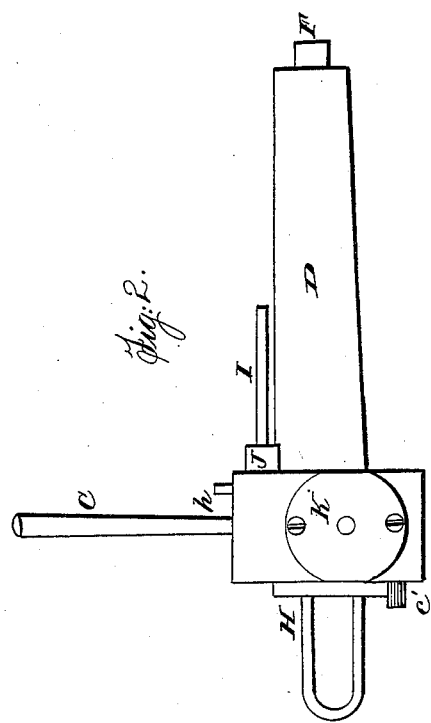
Witnesses.
Inventor.

A. PIERCE.
Car Coupling.
No. 57,962.
2 Sheets—Sheet 2.
Patented Sept. 11, 1866.
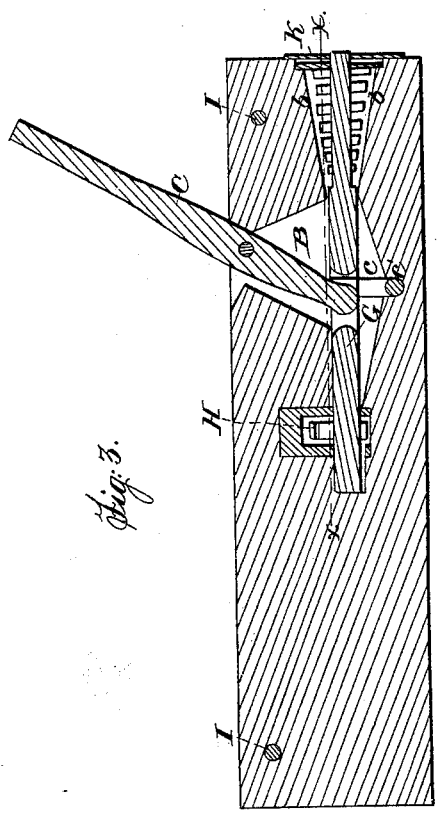
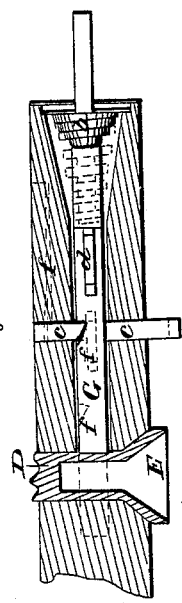
Witnesses.
W. H. Burridge
J. Holms
Inventor.
Ameron Pierce

UNITED STATES PATENT OFFICE.

A. PIERCE, OF OLMSTED FALLS, OHIO.

IMPROVED CAR-COUPLING.

Specification forming part of Letters Patent No. 57,962, dated September 11, 1866.

*To all whom it may concern:*

Be it known that I, A. PIERCE, of Olmsted Falls, in the county of Cuyahoga and State of Ohio, have invented certain new and useful Improvements in Railroad-Car Couplings; and I do hereby declare that the following is a full and complete description of the construction and operation of the same, reference being had to the accompanying drawings, making a part of this specification, in which—

Figure 1 is a front view of the coupling. Fig. 2 is a side or end view of Fig. 1. Fig. 3 is a vertical longitudinal section. Fig. 4 is a top transverse section.

Like letters of reference refer to like parts in the several views.

A, Fig. 1, is a block of wood, and constitutes the head of the coupling. This head consists of two pieces of timber of equal length, breadth, and thickness, being closely and firmly put together by screw-bolts or any suitable means. Near to one end, and between the two pieces, is cut out the space B, Fig. 3, in which the short arm of the lever C plays in the direction of the line indicated by the letters X X. A hole is cut through the middle of the head, through which the beam or bumper D, Fig. 2, passes to the under side of the platform of the car. The front end of this bumper is enlarged or flaring outward, like the ordinary car-bumper, as shown at E, Fig. 1. The rear end is provided with a spring, F, made of rubber or other suitable material, for the purpose of easing the blow consequent upon the cars striking on being brought together for coupling.

G, Figs. 3 and 4, is a sliding bolt passing through from one side of the head to and beyond the hole through which the bumper above described projects. The outer end of this bolt is made smaller than the inner end, and around which the coiled conical spring $b$ is placed, for a purpose hereinafter shown.

$c$, Fig. 4, is a sliding catch working transversely in the head $c'$, the stem of which passes under the bolt G and projects beyond the front of the head, for a purpose hereinafter referred to.

H, Fig. 2, is a link by which the cars are coupled. I I are rods or bolts by which the head is secured to the end of the car-platform. J J are rubber springs placed between the head and end of the car, for the purpose as stated in reference to the spring F. K is a plate covering the hole in which the coiled spring $b$ is placed, and against which it presses when forced back by the bolt; also, through this plate the end of the bolt projects, which serves as a guide to the bolt, and also to keep it in its proper position.

$d$, Fig. 4, is a slot in the sliding bolt, into which the end of the lever C is inserted, and by the means of which it is operated, for the purpose and in the manner as follows: The bolt, as above stated, is of sufficient length to reach beyond the center opening through which the bumper passes. On pushing the lever G in the opposite direction from that shown in Figs. 1 and 3 the bolt is thereby drawn back from the hole to the position shown in Fig. 4, and is retained in this position by the catch $c$, above mentioned, by its being sprung into the notch $f$ on the bolt by the spring indicated by the dotted lines $f'$. The bolt thus being drawn out of the way, the bumper can then be projected through the head, as shown in Fig. 2, and secured in place by a bolt or pin, $h$, passing down through the head into the bumper. The cars for coupling are now brought together. The link H, Fig. 2, is supposed to be on the approaching car. As they come together the link passes into the mouth of the bumper E, the bolt, as above remarked, is drawn back, so that the link can enter beyond it, and when thus beyond it the car strikes against the projecting stem $c'$, and thereby forces the catch out of the notch $f$. The bolt thus released is driven by the strength of the coiled spring $b$ through the link, there being a hole in the bumper corresponding with that in the head in which the bolt slides. The cars are then easily and securely coupled together.

In order to uncouple the cars, also to avoid the dangerous necessity of going between them for that purpose, the lever G is pushed inward toward the coupling. This, as a consequence, forces the bolt back out of the link, and the catch again falls into the notch above described. The cars are thus disconnected, to be moved away or again to be coupled, in the manner as before described.

What I claim as my improvement, and desire to secure by Letters Patent, is—

The arrangement of the lever C, sliding bolt G, and spring $b$, in combination with the sliding catch $c$, springs $f'$, and bumper E, arranged and operating as and for the purpose set forth.

A. PIERCE.

Witnesses:
W. H. BURRIDGE,
J. HOLMES.